J. D. MOON.
CALIPERS AND DIVIDERS.
No. 21,435. Patented Sept. 7, 1858.
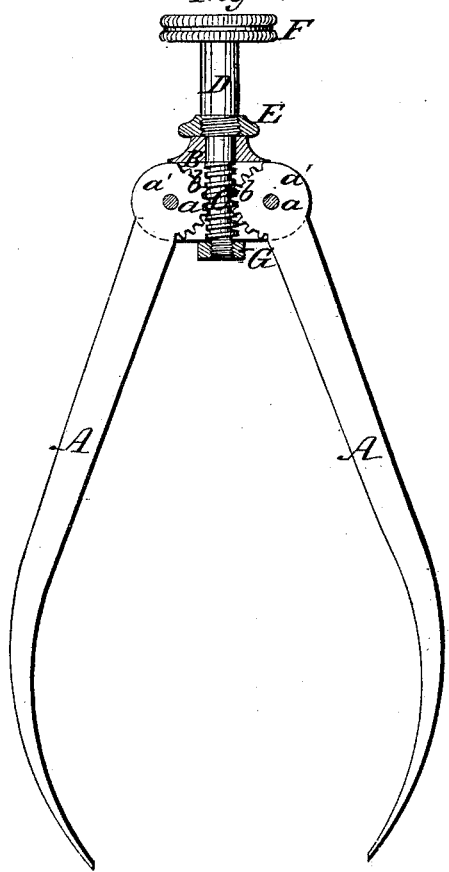
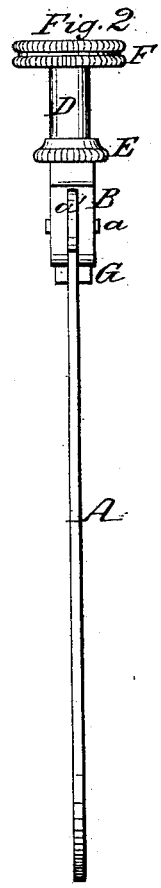

UNITED STATES PATENT OFFICE.

JOSEPH D. MOON, OF CHELSEA, MASSACHUSETTS.

CALIPERS AND DIVIDERS.

Specification of Letters Patent No. 21,435, dated September 7, 1858.

*To all whom it may concern:*

Be it known that I, J. D. MOON, of Chelsea, in the county of Suffolk and State of Massachusetts, have invented a new and useful Improvement in Calipers and Dividers; and I do hereby declare that the following is a full, clear, and exact description of the same, reference being had to the annexed drawings, making a part of this specification, in which—

Figure 1, is a side view of a pair of calipers with the socket bisected showing my improvement. Fig. 2, is an edge view of ditto.

Similar letters of reference indicate corresponding parts in the two figures.

This invention relates to a novel means for adjusting and securing at any desired point the legs of the implement.

The invention consists in having the ends of the legs which surround their pivots made circular and concentric with the pivots, and having said circular portions toothed, with a screw fitted between and gearing into them, by turning which the legs are operated or moved. The above parts are placed within a suitable socket and the screw provided with a jam nut to prevent the casual movement of the same.

To enable those skilled in the art to fully understand and construct my invention I will proceed to describe it.

A, A, represent the two legs of a pair of calipers. These legs are of the usual curved form, and their upper ends are pivoted in a socket B, which is merely a slotted plate of metal of requisite thickness. The pivots are represented by (*a*).

The parts of the legs (*a'*) surrounding the pivots (*a*) and concentric with them are of circular form as shown clearly in Fig. 1, and a portion of the peripheries of these circles, about half, are toothed as shown at (*b*). The toothed portions of the circles are opposite each other and a screw C, is fitted between them and gears into both. The rod D on which the screw is cut extends through the upper end of the socket and has a jam nut E fitted thereon, a fine screw thread being cut on the rod to receive it. This nut bears against the upper end of the socket. A thumb wheel F is placed on the end of the rod D. The screw portion C passes entirely through the socket and has a nut G, on its end.

From the above description of parts it will be seen that by turning the screw C, the legs A may be moved toward or from each other and they will be secured at any point, as the gearing with the assistance of the jam nut E forms a perfect lock of itself, that is, so far as to prevent the casual movement of the legs.

The parts are all constructed of metal and the improvement is applicable to dividers as well as to calipers.

By this improvement a much neater implement is obtained than by the usual mode of adjustment and the space between the legs is not broken or intercepted by any segment or straight bar as in the implements hitherto constructed. My improved implement may be made fully as cheap as those constructed in the usual way.

Having thus described my invention what I claim as new and desire to secure by Letters Patent, is,

Having the parts (*a'*) of the legs made of circular form geared or toothed as shown and the screw C placed between them and gearing therein, the above parts being fitted within the socket B, and the screw provided with nuts F, G, when arranged as described and for the purpose set forth.

JOS. D. MOON.

Witnesses:
  E. F. MILLER,
  HAMLETT BATES.